No. 696,203.  
J. B. SHAW.  
MEANS FOR PREVENTING CLOGGING OF CORN BINDER PACKER ARMS.  
(Application filed May 6, 1901.)

Patented Mar. 25, 1902.

(No Model.)

WITNESSES

INVENTOR
JOHN B SHAW
BY
HIS ATTORNEYS

THE NORRIS PETERS CO., PHOTO-LITHO., WASHINGTON, D. C.

UNITED STATES PATENT OFFICE.

JOHN B. SHAW, OF LITCHFIELD, MINNESOTA.

MEANS FOR PREVENTING CLOGGING OF CORN-BINDER PACKER-ARMS.

SPECIFICATION forming part of Letters Patent No. 696,203, dated March 25, 1902.

Application filed May 6, 1901. Serial No. 58,905. (No model.)

*To all whom it may concern:*

Be it known that I, JOHN B. SHAW, of Litchfield, Meeker county, Minnesota, have invented certain new and useful Improvements in Means for Preventing the Clogging of Corn-Binder Packer-Arms, of which the following is a specification.

The invention relates to attachments for corn-harvesters, particularly of the vertical type.

The object of the invention is to provide means for preventing clogging of the packer-arms and the consequent annoyance and delay resulting therefrom.
The invention consists generally in various constructions and combinations, all as hereinafter described, and particularly pointed out in the claims.

Figure 1:
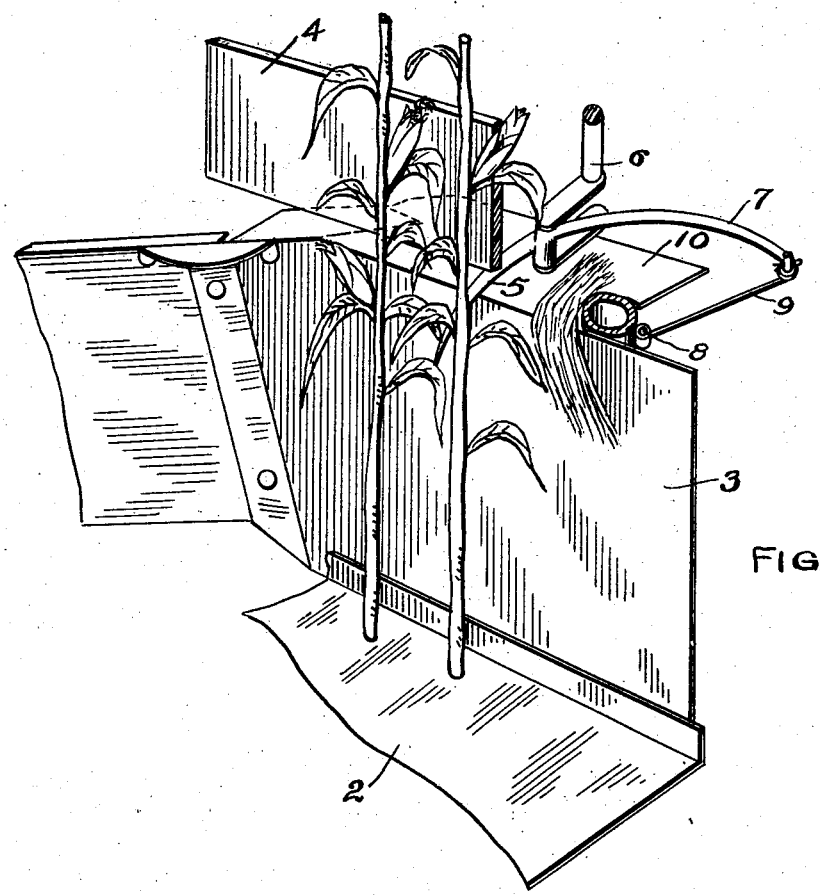
Figure 2:
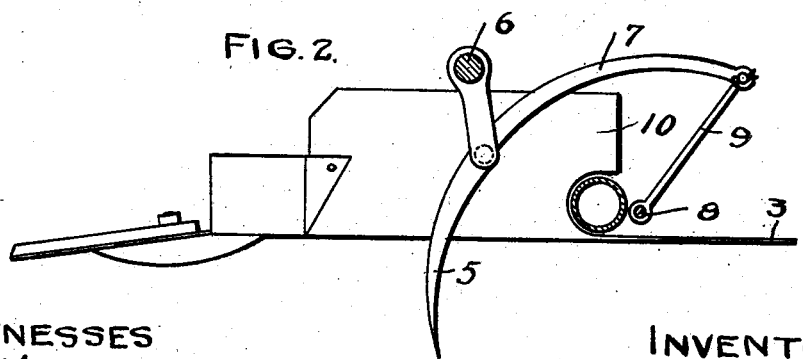

In the accompanying drawings, forming part of this specification, Figure 1 is a detail of a portion of a corn-harvester with my invention applied thereto. Fig. 2 is a horizontal section showing the lower packer-arm and the wing or shelf over which it operates.
In the drawings, 2 represents a portion of the floor on which the stalks move in an upright position.

3 is an upright plate forming the wall on one side of the plate 2. Above this plate is a board 4, and between them the lower packer-arm 5 operates upon a packer crank-shaft 6. The packer-arm projects into the space over the floor 2 between the plate 3 and the board 4 and pushes the stalks back over the floor to the point where they are bound. This packer is provided with an arm 7, that is pivotally connected with a standard 8 by a link 9. The revolution of the crank-shaft 6 imparts a gyrating motion to the packer-arm, and causes it to be alternately withdrawn from and projected into the space occupied by the moving stalks of corn. As ordinarily constructed the plate 3 will catch the pigeon-grass brought in by the cornstalks, and the heads of the grasses dropping over the edge of the plate will be hung thereon until a sufficiently large bunch is formed to clog the packer-arm and prevent its operation. These bunches of grass will collect quite frequently and stop the movement of the packers and necessitate stopping the machine, clearing it of the corn, and pulling or picking out the grass from the clogged parts. As more or less grass is mixed with the growing corn it will clog the packers in a short time, and as it is almost always necessary to clear away the obstruction by hand it follows that a great deal of time is lost in the operation of the machine. All this difficulty and objection I have obviated by providing a shelf or wing 10, arranged horizontally beneath the packer-arm 5 and preferably extending laterally from the top of the plate 3. The packer-arm operates over this wing, and as the grasses are brought in by the cornstalks and are deposited on the top of the plate 3 the heads will lie on the flat surface of the wing, and when the corn passes back over the packer-arm and out of the machine it will carry the grass along with it, there being no edges or corners on the plate 10 upon which the grass can lodge. I have demonstrated by actual tests that this wing will absolutely prevent any grass that may be brought into the machine from lodging beneath the packer-arm and clogging the same.

I do not confine myself to any particular width of wing; but it should be sufficiently wide so that there will be no danger of the heads of the grasses lodging on the outer edge of the wing.

Having thus described my invention, I claim as new and desire to secure by Letters Patent—

1. In a corn harvester and binder, the combination, with an upright plate 3, of a board 4 above the same and spaced therefrom, a crank-shaft, a packer-arm thereon operating through the space between said plate and said board, and a horizontal wing provided on the upper edge of said plate between it and said shaft, for the purpose specified.

2. In a corn harvester and binder, the combination, with a floor 2 whereon the cornstalks move in an upright position, of a plate 3 forming a wall at one side of said floor, an upright crank-shaft, a packer-arm thereon adapted to overhang said floor and engage the stalks thereon, and a laterally-extending wing or plate provided on said plate 3 between it and said shaft, said plate being of sufficient width to prevent the grass brought in by the corn from lodging on the upper side thereof, whereby clogging of the packer-arm is prevented.

3. In a corn harvester and binder, the combination, with a vertical wall past which the corn moves in an upright position, of a crank-shaft, a gyrating packer-arm mounted on said shaft, and adapted to overhang said wall and engage the stalks of corn, and a horizontal wing provided at the upper edge of said wall near said arm and between said wall and shaft, said wing being of sufficient width to prevent the grass brought in by the corn from lodging thereon and on the edge of said wall and clogging said packer-arm.

4. In a corn harvester and binder, the combination, with a floor provided with an upright wall past which the cornstalks are moved, of a crank-shaft near said wall, a packer provided on said shaft and having an arm 7, an upright standard 8 near said wall, a link connecting said standard and said arm, and a horizontal wing or plate provided on the upper edge of said wall near said packer and extending laterally beneath the same to prevent the grasses brought in by the corn from lodging on said wall, substantially as described.

In witness whereof I have hereunto set my hand this 2d day of May, 1901.

JOHN B. SHAW.

In presence of—
JNO. GAYNER,
V. H. HARRIS.